United States Patent
Chao

(10) Patent No.: US 9,527,645 B2
(45) Date of Patent: Dec. 27, 2016

(54) WATERPROOF BOX STRUCTURE

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 14 days.

(21) Appl. No.: 14/510,070

(22) Filed: Oct. 8, 2014

(65) Prior Publication Data

US 2015/0173229 A1 Jun. 18, 2015

Related U.S. Application Data

(60) Provisional application No. 61/917,266, filed on Dec. 17, 2013.

(30) Foreign Application Priority Data

Apr. 28, 2014 (CN) .......................... 2014 1 0175206

(51) Int. Cl.
*A45C 11/00* (2006.01)
*B65D 81/02* (2006.01)
(Continued)

(52) U.S. Cl.
CPC ............ *B65D 81/02* (2013.01); *A45C 13/008* (2013.01); *B29C 45/14221* (2013.01); *B29C 45/14811* (2013.01); *H04M 1/04* (2013.01); *H04M 1/18* (2013.01); *A45C 2011/002* (2013.01); *B29C 45/14336* (2013.01); *B29K 2101/12* (2013.01); *B29K 2995/007* (2013.01); *B29L 2031/712* (2013.01)

(58) Field of Classification Search
CPC .............. A45C 11/00; A45C 2011/001; A45C 2011/002; A45C 2011/003; A45C 13/008; B29K 2101/10; B29K 2101/12; H05K 5/065; B65D 1/22; B65D 1/32; B65D 1/34

See application file for complete search history.

(56) References Cited

U.S. PATENT DOCUMENTS 4,617,207 A * 10/1986 Ueki .......................... C08J 5/18
264/176.1
9,204,697 B2 * 12/2015 Yang ...................... A45C 11/00
(Continued)

FOREIGN PATENT DOCUMENTS

CN 201905390 U 7/2011
CN 203086526 U 7/2013

*Primary Examiner* — Anthony Stashick
*Assistant Examiner* — Mollie Impink

(57) ABSTRACT

A waterproof box structure includes a composite plate and an external frame. The composite plate includes a chemical hardened layer and a thermoplastic resin layer attached to each other, and a surface of the thermoplastic resin layer is attached onto the chemical hardened layer, and the external periphery of the thermoplastic resin layer is extended and protruded from the external periphery of the chemical hardened layer. The external frame is formed and covered onto the external periphery of the composite plate by an injection molding method, and the internal periphery of the external frame is covered onto the external periphery of thermoplastic resin layer and combined with the thermoplastic resin layer.

3 Claims, 8 Drawing Sheets

(51) Int. Cl.
*H04M 1/18* (2006.01)
*A45C 13/00* (2006.01)
*H04M 1/04* (2006.01)
*B29C 45/14* (2006.01)
*B29K 101/12* (2006.01)
*B29L 31/00* (2006.01)

(56) References Cited

U.S. PATENT DOCUMENTS

2007/0202933 A1* 8/2007 Tolbert .............. B32B 17/10018
　　　　　　　　　　　　　　　　　　　　　　　455/575.1
2014/0346078 A1* 11/2014 Chang ................... A45C 11/00
　　　　　　　　　　　　　　　　　　　　　　　206/521

* cited by examiner

WATERPROOF BOX STRUCTURE

FIELD OF THE INVENTION

The present invention relates to a waterproof box, and more particularly to the waterproof box structure with a simple structure and an easy manufacture, and a manufacturing method of the waterproof box.

BACKGROUND OF THE INVENTION

Waterproof box is an accessory commonly used for protecting a mobile electronic device, and the waterproof box can cover the mobile electronic device and isolate external water vapor and dust, so as to prevent the water vapor and dust from damaging the mobile electronic device contained in the waterproof box.

In general, the waterproof box comes with a piece of tempered glass disposed at a position corresponding to the installation position of a display device of the mobile electronic device, so that users can view the content displayed by the display device through the tempered glass. In addition, the waterproof box also has an external frame disposed around the periphery of the tempered glass. The tempered glass is made of a composite plate, so that when a soft device is installed at the tempered glass, it is necessary to compress the joint between the external frame and the tempered glass to assure the watertight effect of the joint, and such structure is complicated, and the yield rate of the manufacture is low.

In view of the foregoing drawbacks of the prior art, the inventor of the present invention based on years of experience in the related industry to conduct extensive researches and experiments and provided a feasible solution to overcome the drawbacks of the prior art.

SUMMARY OF THE INVENTION

Therefore, it is a primary objective of the present invention to provide a waterproof box structure with a simple structure and an easy manufacture and a manufacturing method thereof.

To achieve the aforementioned objective, the present invention provides a waterproof box structure comprising a composite plate and an external frame. The composite plate includes a chemical hardened layer and a thermoplastic resin layer attached to each other. One of the surfaces of the thermoplastic resin layer is attached onto the chemical hardened layer, and the external periphery of thermoplastic resin layer is extended and protruded from the external periphery of the chemical hardened layer. The external frame is formed and covered onto the external periphery of the composite plate by an injection molding method, and the internal periphery of the external frame is covered onto the external periphery of the thermoplastic resin layer and combined with the thermoplastic resin layer.

To achieve the aforementioned objective, the present invention further provides a manufacturing method of the waterproof box structure, and the manufacturing method comprises the following steps: Provide a composite plate, wherein the composite plate includes a chemical hardened layer and a thermoplastic resin layer attached to each other. Form a through hole on the composite plate, wherein the through hole penetrates through the chemical hardened layer and the thermoplastic resin layer. Remove the chemical hardened layer from the internal periphery of the through hole, so that the thermoplastic resin layer is protruded out from the internal periphery of the through hole towards the through hole to form a flange. Finally, form an external frame to cover the through hole, so that the external periphery of the external frame is covered onto the flange and combined with the flange.

By removing the external periphery of the chemical hardened layer, the thermoplastic resin layer is exposed to form a flange and provided for fusing and connecting the external frame. The invention not just comes with a simple structure only, but also features an easy manufacture by molding.

DESCRIPTION OF THE PREFERRED EMBODIMENTS

Figure 1:
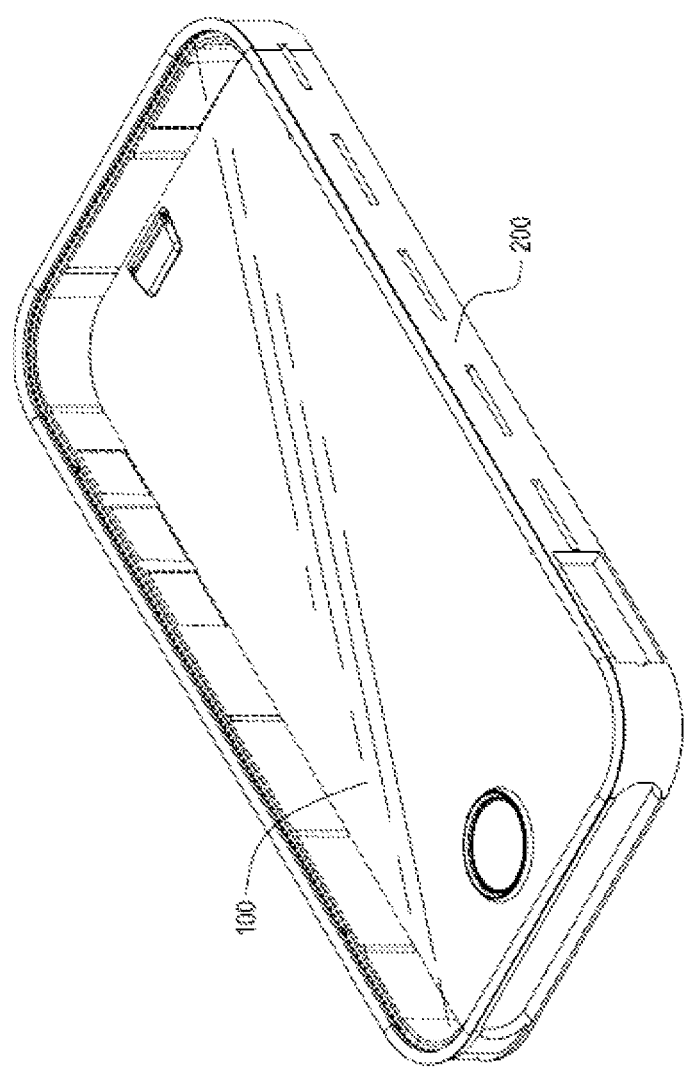
FIG. 1 is a perspective view of a waterproof box structure of the present invention.

The technical contents of the present invention will become apparent with the detailed description of preferred embodiments accompanied with the illustration of related drawings as follows. It is noteworthy that same numerals are used for representing same respective elements in the drawings.

With reference to FIG. 1 for a perspective view of a waterproof box structure in accordance with a first preferred embodiment of the present invention, the waterproof box structure comprises a composite plate 100 and an external frame 200.

Figure 2:
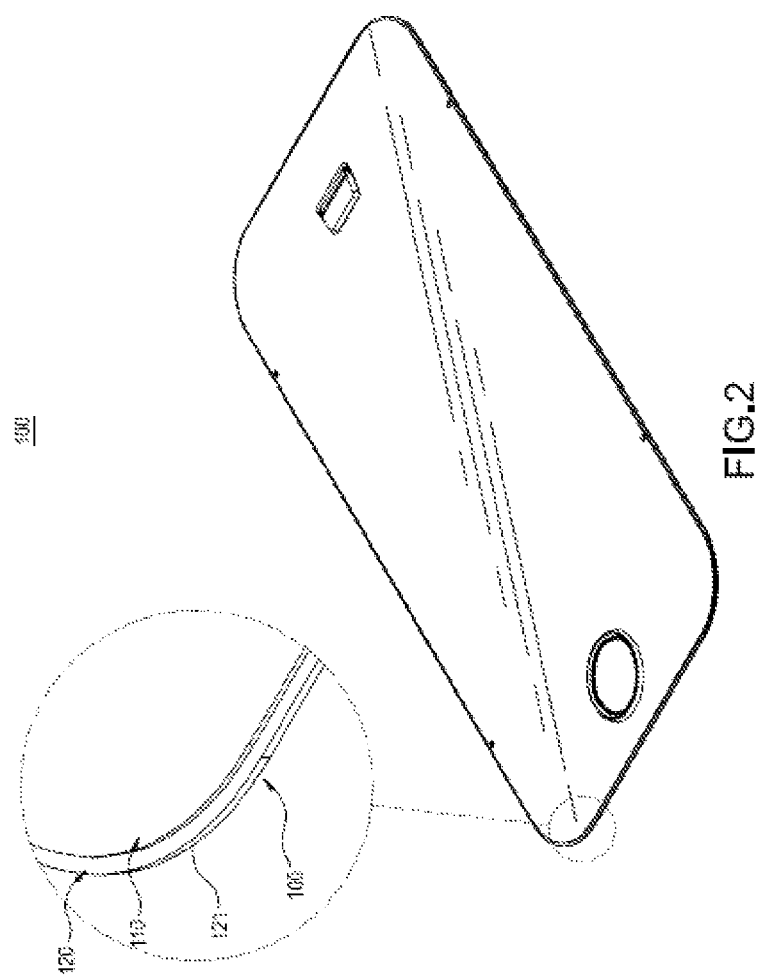
FIG. 2 is a perspective view of a composite plate of a waterproof box structure of the present invention.
Figure 3:
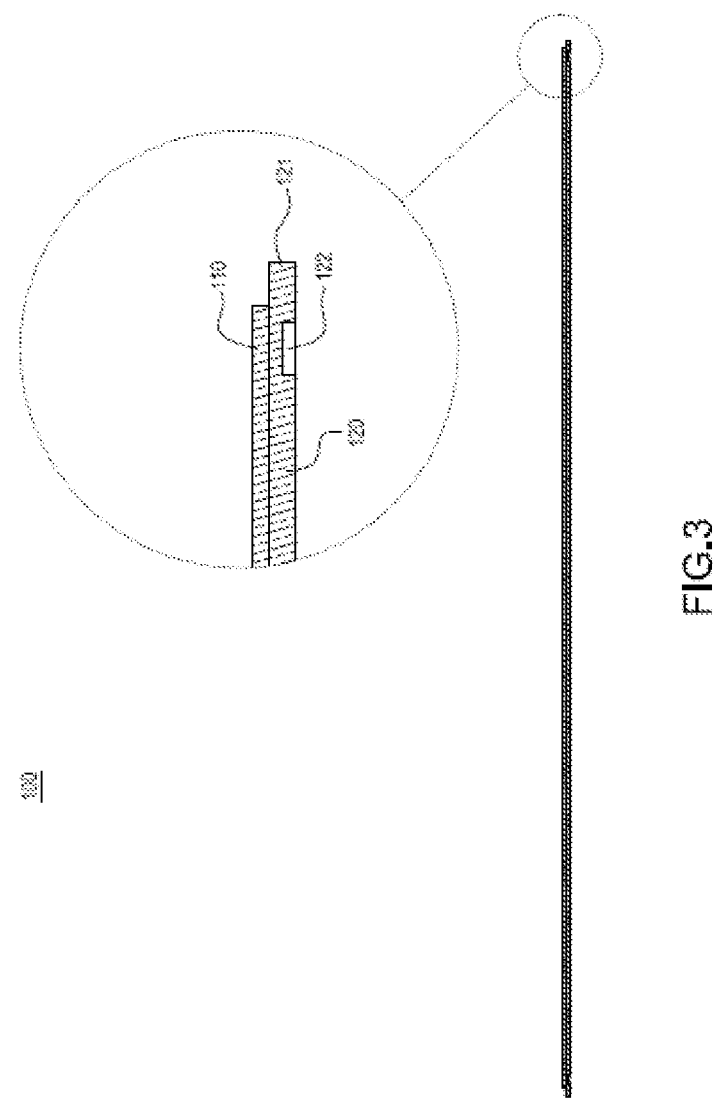
FIG. 3 is a cross-sectional view of a composite plate of a waterproof box structure of the present invention.

With reference to FIGS. 2 and 3 for a perspective view and a cross-sectional of a composite plate of a waterproof box structure of the present invention respectively, the composite plate 100 is formed by attaching and combining a chemical hardened layer 110 and a thermoplastic resin layer 120 with each other. A surface of the thermoplastic resin layer 120 is attached onto a surface of the chemical hardened layer 110, and the external periphery of the thermoplastic resin layer 120 is extended outwardly and protruded out from the external periphery of the chemical hardened layer 110 to form a flange 121. The other surface of the thermoplastic resin layer 120 has a groove 122 formed thereon, and preferably extended from the flange 121 and disposed around the external periphery of the thermoplastic resin layer 120. The external periphery of the thermoplastic resin layer 120 is disposed around the external periphery of the chemical hardened layer 110. The groove 122 is formed around the external periphery of the thermoplastic resin layer 120.

Figure 4:
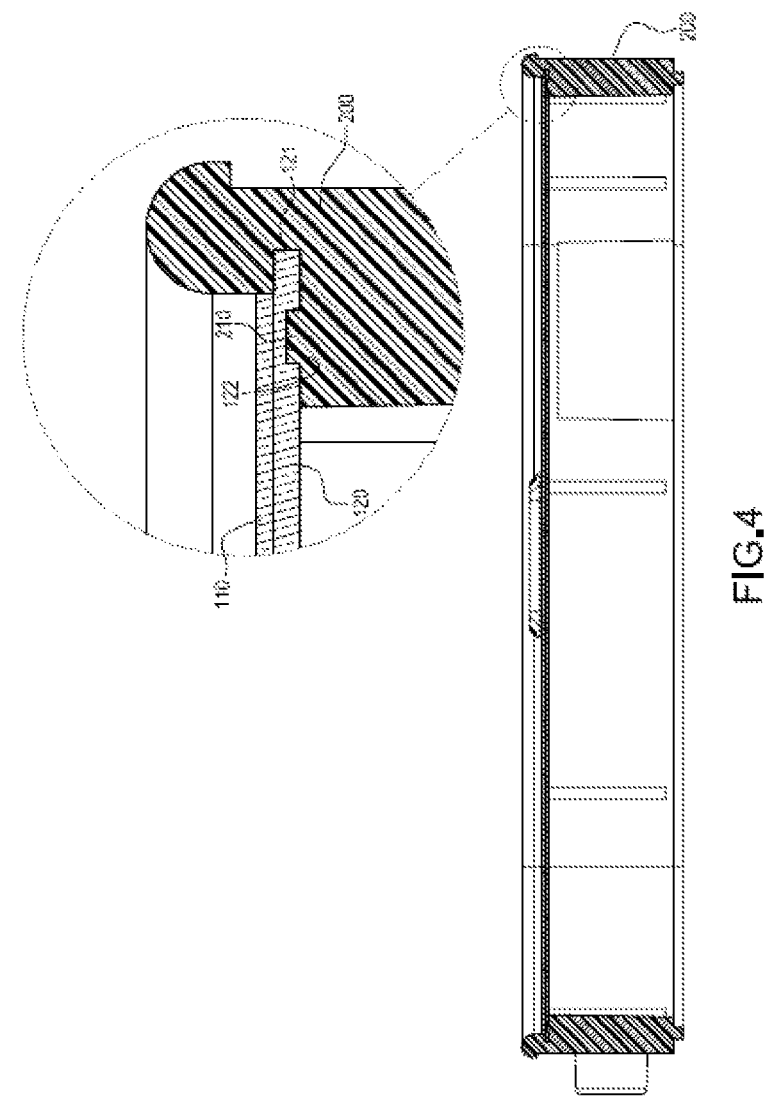
FIG. 4 is a cross-sectional view of an external frame of a waterproof box structure of the present invention.

With reference to FIG. 4 for a cross-sectional view of an external frame of a waterproof box structure of the present invention, the external frame 200 is formed and covered onto the external periphery of the composite plate 100 by an injection molding method, and the internal periphery of the external frame 200 is covered onto the external periphery of the thermoplastic resin layer 120 and combined with the thermoplastic resin layer 120. The external frame 200 is formed and covered onto the external periphery of the composite plate 100 by in injection molding method, so that the external frame 200 and the composite plate 100 are combined with each other. The internal periphery of the external frame 200 corresponding to the groove 122 is extended and protruded to form a rib 210, wherein the rib 210 has a shape and position corresponding to those of the groove 122, and the rib 210 is filled into the groove 122. The external frame 200 is engaged with groove 122 of the composite plate 100 by the rib 210, so that the external frame 200 can be combined with the composite plate 100 securely.

Figure 5:
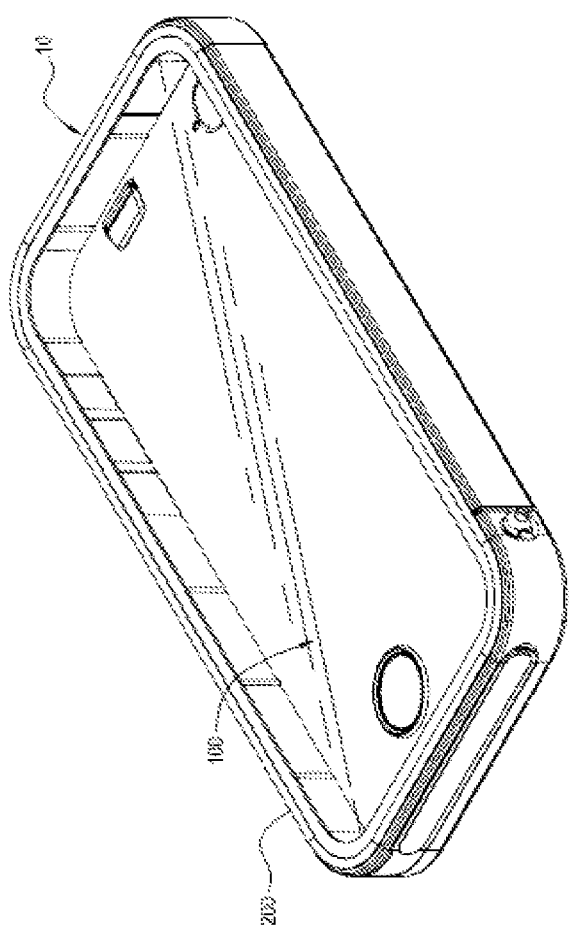
FIG. 5 is a schematic view of a using status of a waterproof box structure of the present invention.
Figure 6:
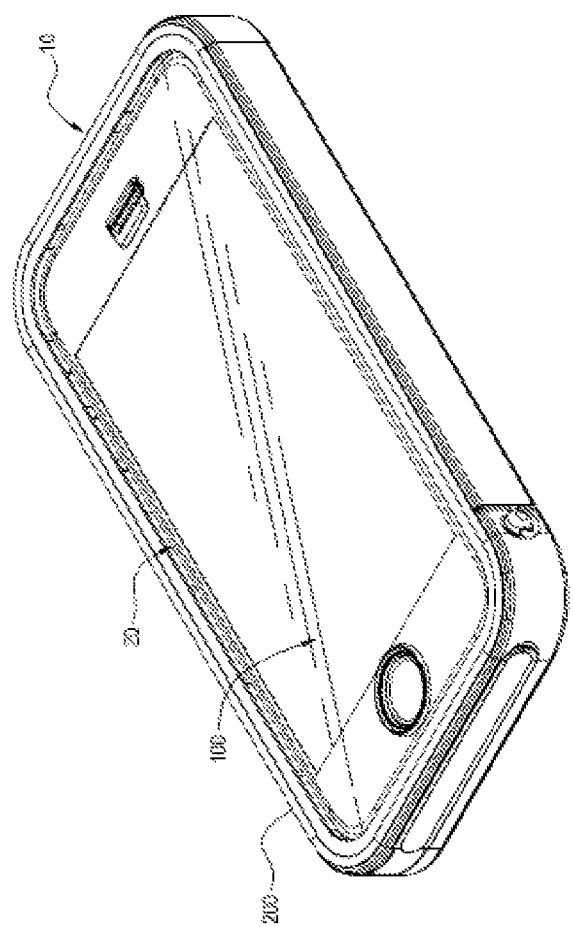
FIG. 6 is a schematic view of another using status of a waterproof box structure of the present invention.
Figure 7:
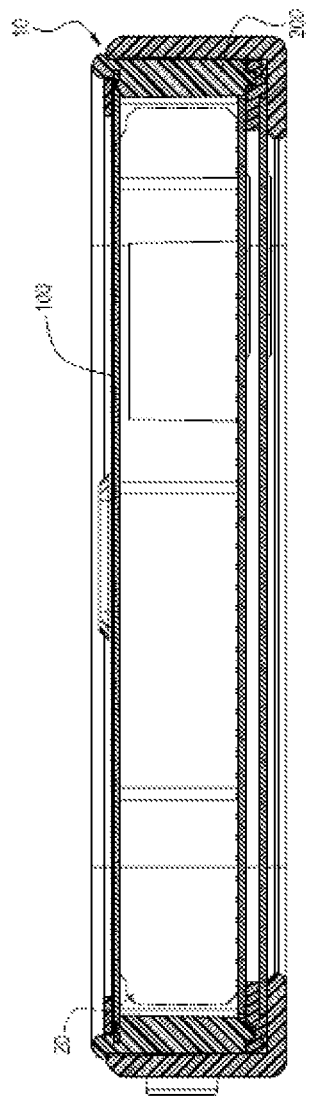
FIG. 7 is a cross-sectional view of a waterproof box structure of the present invention as depicted in FIG. 6.

With reference to FIGS. 5 to 7 for the schematic views and the cross-sectional view of the using statuses of a waterproof box structure of the present invention respectively, the waterproof box structure of the present invention is applied to a waterproof box 10 as shown in FIG. 5. In FIG. 6, the waterproof box is covered onto a mobile electronic device 20, so that the mobile electronic device 20 is sealed in the waterproof box 10 to stop water or moisture from entering into the mobile electronic device 20 and damaging the mobile electronic device 20. The surface of the chemical hardened layer 110 of the composite plate 100 is disposed on an external side of the waterproof box and provided for resisting the wearing by external objects, and the surface of the thermoplastic resin layer 120 is disposed on an internal side of the waterproof box. The external frame 200 is covered onto a lateral side of the mobile electronic device 20, and the composite plate 100 and the external frame 200 are connected tightly with each other by the aforementioned structure.

The present invention further provides a manufacturing method of the waterproof box structure, and the method comprises the following steps. It is noteworthy that the order of the steps is not limited to the step as described in this embodiment only.

Figure 8:
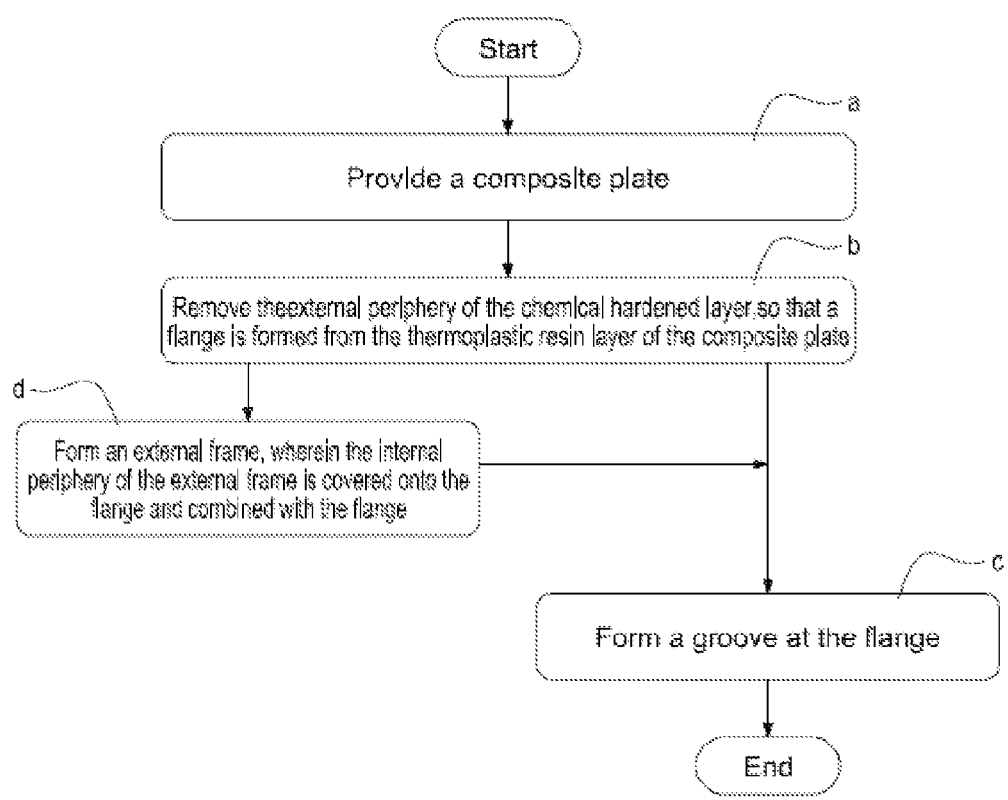
FIG. 8 is a flow chart of a manufacturing method of a waterproof box structure of the present invention.

In FIGS. 2, 3 and 8, FIGS. 2 and 3 are the same as the previous embodiment, and FIG. 8 is the flow chart of the manufacturing method of a waterproof box structure of the present invention. In Step A as shown in FIG. 8, a composite plate 100 as shown in FIG. 2 is provided. Wherein, the composite plate 100 as shown in FIG. 3 includes a chemical hardened layer 110 and a thermoplastic resin layer 120 attached and combined with each other. Preferably, a surface of the thermoplastic resin layer 120 is attached to a surface of the chemical hardened layer 110.

In Step B as shown in FIG. 8, a milling cutter is used to remove the chemical hardened layer 110 from the external periphery of the composite plate 100. Therefore, the external periphery of the thermoplastic resin layer 120 is beyond the external periphery of the chemical hardened layer 110 to form a flange 121. In this preferred embodiment, the flange 121 is extended around the external periphery of the chemical hardened layer 110.

In Step D (which is an optional step carried out after Step B) as shown in FIG. 8, a groove 122 is preferably formed on the other surface of the thermoplastic resin layer 120. In this preferred embodiment, the groove 122 is formed on an internal side of the flange 121 and disposed around the external periphery of the thermoplastic resin layer 120.

In this preferred embodiment, Step C is carried out after Step D. If Step D is not executed, then Step C will be carried out after Step B.

If Step C is carried out after Step B, the composite plate 100 processed by the previous steps is placed into a mold for injection molding, and an external frame 200 is formed and covered onto the external periphery of the composite plate 100 by an injection molding method, wherein the internal periphery of the external frame 200 is preferably covered onto the flange 121 and combined with the flange 121, and a portion of the internal periphery of the external frame 200 is preferably filled into the groove 122, so that the external frame 200 and the composite plate 100 can be combined with each other securely.

In the waterproof box structure and the manufacturing method thereof in accordance with the present invention, the chemical hardened layer 110 of the composite plate 100 cannot be heated and then melted, so that it is necessary to use a milling cutter to remove a portion of the chemical hardened layer 110 of the composite plate 100. As a result, this area of the thermoplastic resin layer 120 is exposed to form a flange 121. When a high-temperature material is injected into a mold to form an external frame 200, the material is in contact with the flange 121 to soften the flange 121, so that the flange 121 can be fused and combined tightly with the external frame 200 to assure the watertight connection at the joint between the composite plate 100 and the external frame 200. In addition, the waterproof box structure of the present invention not just has a simple structure only, but also features an easy manufacture.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A waterproof box structure, comprising:
   a composite plate comprising a chemical hardened layer and a thermoplastic layer, the chemical hardened layer overlaying a major surface of the thermoplastic layer and being attached thereto, a major surface area of the thermoplastic layer being greater than a major surface area of the chemical hardened layer such that a flange is formed, the flange comprising an external periphery of the thermoplastic resin layer extending from and surrounding an external periphery of the chemical hardened layer; and
   an external frame formed in a mold with the composite plate by injection molding, wherein an internal periphery of the external frame covers the external periphery of the thermoplastic resin layer and is fused with the flange during the injection molding;
   wherein a groove is formed on a surface of the thermoplastic resin layer opposite to the chemical hardened layer, and a portion of the internal periphery of the external frame is filled into the groove.

2. The waterproof box structure of claim 1, wherein the groove forms a closed loop along the external periphery of the thermoplastic resin layer.

3. The waterproof box structure according to claim 1, wherein the flange comprises an upper surface adjacent to the chemical hardened layer, a bottom surface opposite to the chemical hardened layer, and a side surface there between, and an internal periphery of the external frame is fused with the upper surface, side surface, and bottom surface of the flange.

\* \* \* \* \*